(12) United States Patent
Murray

(10) Patent No.: US 9,537,281 B2
(45) Date of Patent: Jan. 3, 2017

(54) SYSTEM AND METHOD FOR PROVIDING MULTIPLE SIMMER OUTPUTS

(71) Applicant: Cooper Technologies Company, Houston, TX (US)

(72) Inventor: Shawn Patrick Murray, Leechburg, PA (US)

(73) Assignee: Cooper Technologies Company, Houston, TX (US)

( * ) Notice: Subject to any disclaimer, the term of this patent is extended or adjusted under 35 U.S.C. 154(b) by 10 days.

(21) Appl. No.: 14/724,421

(22) Filed: May 28, 2015

(65) Prior Publication Data

US 2016/0352065 A1   Dec. 1, 2016

(51) Int. Cl.
*H01S 3/00* (2006.01)
*H01S 3/09* (2006.01)
*H01S 3/0915* (2006.01)

(52) U.S. Cl.
CPC .............. *H01S 3/09* (2013.01); *H01S 3/0915* (2013.01)

(58) Field of Classification Search
CPC ......... H05B 41/34; H05B 37/00; H01S 5/042; H01S 3/0915
USPC ....................................................... 372/38.04
See application file for complete search history.

(56) References Cited

U.S. PATENT DOCUMENTS

| | | | |
|---|---|---|---|
| 6,273,883 B1 | 8/2001 | Furumoto | |
| 7,139,680 B2 | 11/2006 | Orozco | |
| 7,274,155 B2 * | 9/2007 | Inochkin | H05B 41/34 315/246 |
| 7,780,652 B2 * | 8/2010 | MacFarland | A61B 18/203 606/1 |
| 8,480,721 B2 | 7/2013 | Owens et al. | |
| 8,613,741 B1 | 12/2013 | Jones et al. | |
| 2012/0010684 A1 | 1/2012 | Owens et al. | |

FOREIGN PATENT DOCUMENTS

| | | |
|---|---|---|
| KR | 101229111 B1 | 2/2013 |
| WO | 2007007951 A1 | 1/2007 |

* cited by examiner

*Primary Examiner* — Tuan Nguyen
(74) *Attorney, Agent, or Firm* — Ziolkowski Patent Solutions Group, SC

(57) ABSTRACT

A power supply and circuitry system for powering HVPT devices includes a power supply circuit that selectively provides an operating power and a simmer power to multiple HVPT devices. The system also includes a trigger circuit for each respective HVPT device that selectively couples the power supply circuit to one HVPT device to provide the operating power thereto. The system also includes a simmer control circuit for selectively coupling the power supply circuit to the HVPT devices to provide the simmer power thereto, the simmer control circuit further including a simmer switch circuit for each HVPT device, wherein each simmer switch circuit comprises an input coupled to the power supply circuit to receive the simmer power therefrom and an output coupled to one HVPT device. The simmer control circuit also further includes a simmer drive circuit coupled to each simmer switch circuit for selectively enabling the simmer switch circuits.

20 Claims, 6 Drawing Sheets

SYSTEM AND METHOD FOR PROVIDING MULTIPLE SIMMER OUTPUTS

BACKGROUND OF THE INVENTION

The present invention relates generally to simmer power supplies and, more particularly, to systems incorporating a simmer control circuit with outputs to multiple devices and methods of operation thereof that provide for high efficiency operation of the systems.

Some devices, such as arc and flash lamps for solid-state laser systems, require high-voltage trigger pulses to operate. Often, such high-voltage-pulse-triggered (HVPT) devices are connected with a simmer power supply providing a low current through the device during device operation. The low current provided by a simmer power supply may range from milliamperes to several amperes, depending on the device characteristics, and may allow for the use of a low-voltage trigger pulse to transfer energy to the device, extend the life of the device, improve pulse-to-pulse jitter in the device, and overcome most electromagnetic interference problems present in the device when a simmer power supply is not used.

Frequently, different HVPT devices are used in the same system. For example, it may be desirable to use multiple laser heads in an arc-lamp-pumped laser system. Such a laser system might be useful in dermatology for hair and tattoo removal and skin rejuvenation and augmentation, as examples. However, current systems including HVPT devices are large and inefficient because they require a separate simmer power supply for each device in the system.

It would therefore be desirable to design a smaller, more efficient, and more cost effective system for HVPT devices.

BRIEF DESCRIPTION

Embodiments of the present invention provide a simmer control circuit. The simmer control circuit may selectively couple a single simmer power supply to multiple devices in a system.

In accordance with one aspect of the invention, a power supply and circuitry system for powering multiple HVPT devices includes a power supply circuit configured to selectively provide an operating power and a simmer power to at least two HVPT devices, and a trigger circuit for each HVPT device of the at least two HVPT devices that selectively couples the power supply circuit to one HVPT device of the at least two HVPT devices to provide the operating power thereto, wherein each trigger circuit is coupled to one HVPT device of the at least two HVPT devices. The power supply and circuitry system also includes a simmer control circuit for selectively coupling the power supply circuit to the at least two HVPT devices to provide the simmer power thereto, the simmer control circuit further including a simmer switch circuit for each HVPT device of the at least two HVPT devices, wherein each simmer switch circuit comprises an input coupled to the power supply circuit to receive the simmer power therefrom and an output coupled to one HVPT device of the at least two HVPT devices. The simmer control circuit also further includes a simmer drive circuit coupled to each simmer switch circuit for selectively enabling the simmer switch circuits.

In accordance with another aspect of the invention, a simmer control circuit for selectively coupling a simmer power supply to multiple HVPT devices includes at least two simmer switch circuits, wherein each simmer switch circuit comprises an input coupleable to a simmer power supply and an output coupleable to an HVPT device. The simmer control circuit also includes a simmer drive circuit coupled to each simmer switch circuit of the at least two simmer switch circuits for selectively enabling the at least two simmer switch circuits and a device select circuit coupled to the simmer drive circuit for selectively enabling the simmer drive circuit. The simmer drive circuit enables a simmer switch circuit of the at least two simmer switch circuits responsive to a selection of an HVPT device provided as an input to the device select circuit, so as cause the enabled simmer switch circuit to provide a simmer power from the simmer power supply to the selected HVPT device.

In accordance with yet another aspect of the invention, a method of providing simmer power to multiple HVPT devices includes providing a single simmer power supply and providing at least two simmer switch circuits, wherein each simmer switch circuit comprises an input coupleable to the single simmer power supply and an output coupleable to a respective HVPT device of the multiple HVPT devices. The method also includes coupling a simmer drive circuit to each simmer switch circuit of the at least two simmer switch circuits for selectively enabling the at least two simmer switch circuits, coupling a device select circuit to the simmer drive circuit for selectively enabling the simmer drive circuit, and providing an input to the device select circuit comprising selection of an HVPT device of the multiple HVPT devices for operation. The method further includes generating a device selection signal via the device select circuit responsive to the input and causing the simmer drive circuit to enable a simmer switch circuit of the at least two simmer switch circuits responsive to the device selection signal, with the enabled simmer switch circuit providing a simmer power from the single simmer power supply to the selected HVPT device.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to simmer control circuits. The simmer control circuits allow for a system including multiple HVPT devices to use a single simmer power supply for all of the multiple HVPT devices. Therefore, the simmer control circuits allow for systems to be smaller, more efficient, and more cost effective.

Figure 1:
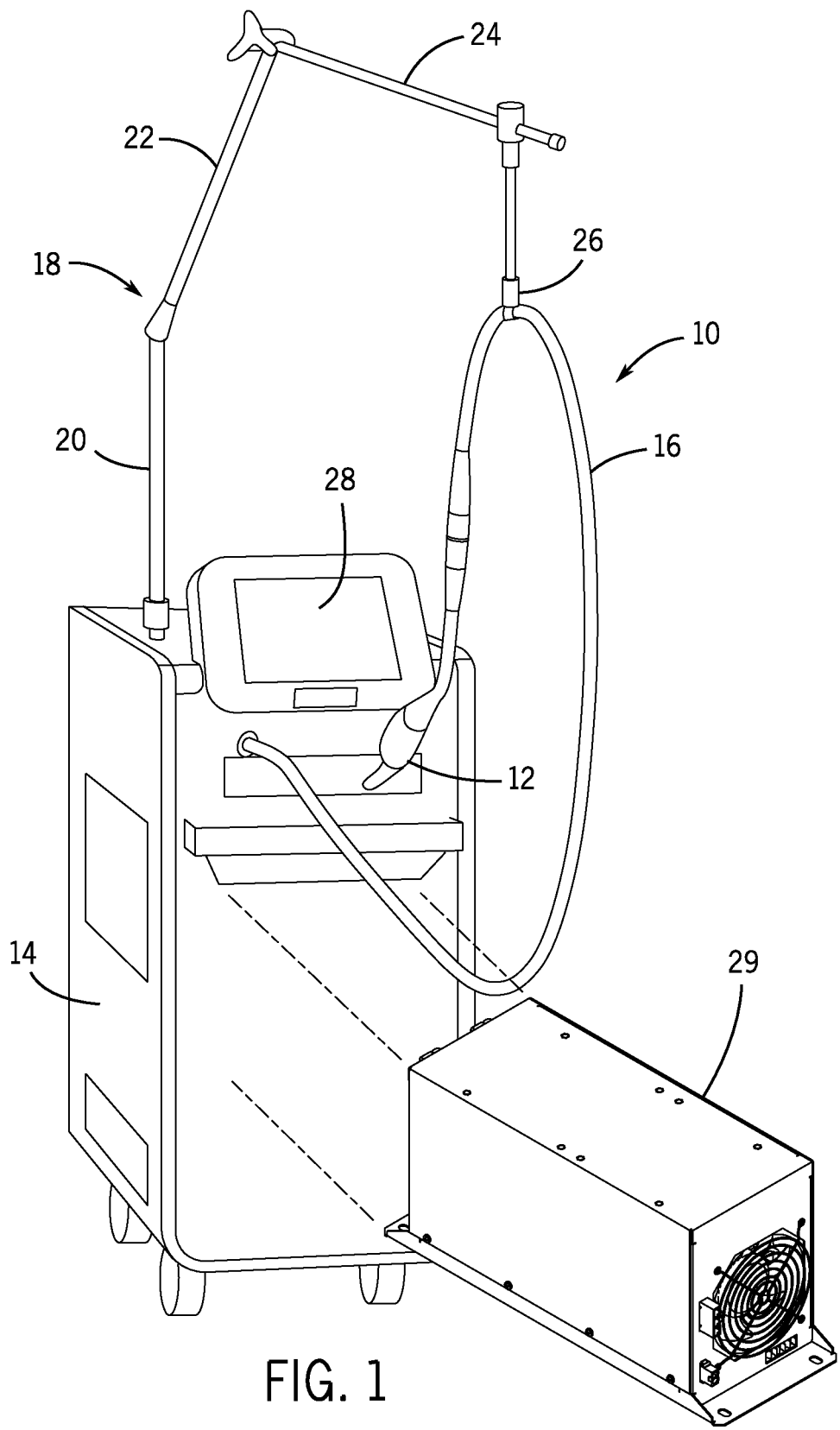
FIG. 1 is a system including multiple HVPT devices useable with embodiments of the invention.

Referring to FIG. 1, a system 10 including multiple HVPT devices 12 is shown as an example of a system useable with embodiments of the present invention, although it is recognized that embodiments of the present invention are useable with/in various types of systems that include multiple HVPT devices, such that the illustrated system 10 is not meant to limit the scope of the invention. In the illustrated embodiment, system 10 is an arc-lamp-pumped laser system, and HVPT devices 12 include multiple laser heads. The HVPT devices 12 are coupled to a cabinet 14 by way of a cable 16. Cable 16 may be supported by a support post 18. Support post 18 may include multiple hinged sections 20, 22, 24 so cable 16 may be maneuvered easily. Support post 18 may also include a hook or loop 26, such as a carabiner, attached to support post section 24 for supporting cable 16. System 10 also includes a user interface 28 for controlling system 10. An operator may access user interface 28 to select an HVPT device from the available HVPT devices 12 for use. For example, if system 10 is an arc-lamp-pumped laser system and HVPT devices 12 include multiple laser heads, an operator may select one of the laser heads for use.

Cabinet 14 encloses a power supply and circuitry system 29 (shown exploded out from cabinet 14) for system 10 that is used to control and operate the HVPT devices 12. The power supply and circuitry system 29 of system 10 includes a high-voltage power supply, igniter or trigger circuits for selectively coupling the high-voltage power supply to the HVPT devices 12, a simmer power supply, and a simmer control circuit for selectively coupling the simmer power supply to the HVPT devices 12, as will be described further with respect to FIGS. 2 and 3.

Figure 2:
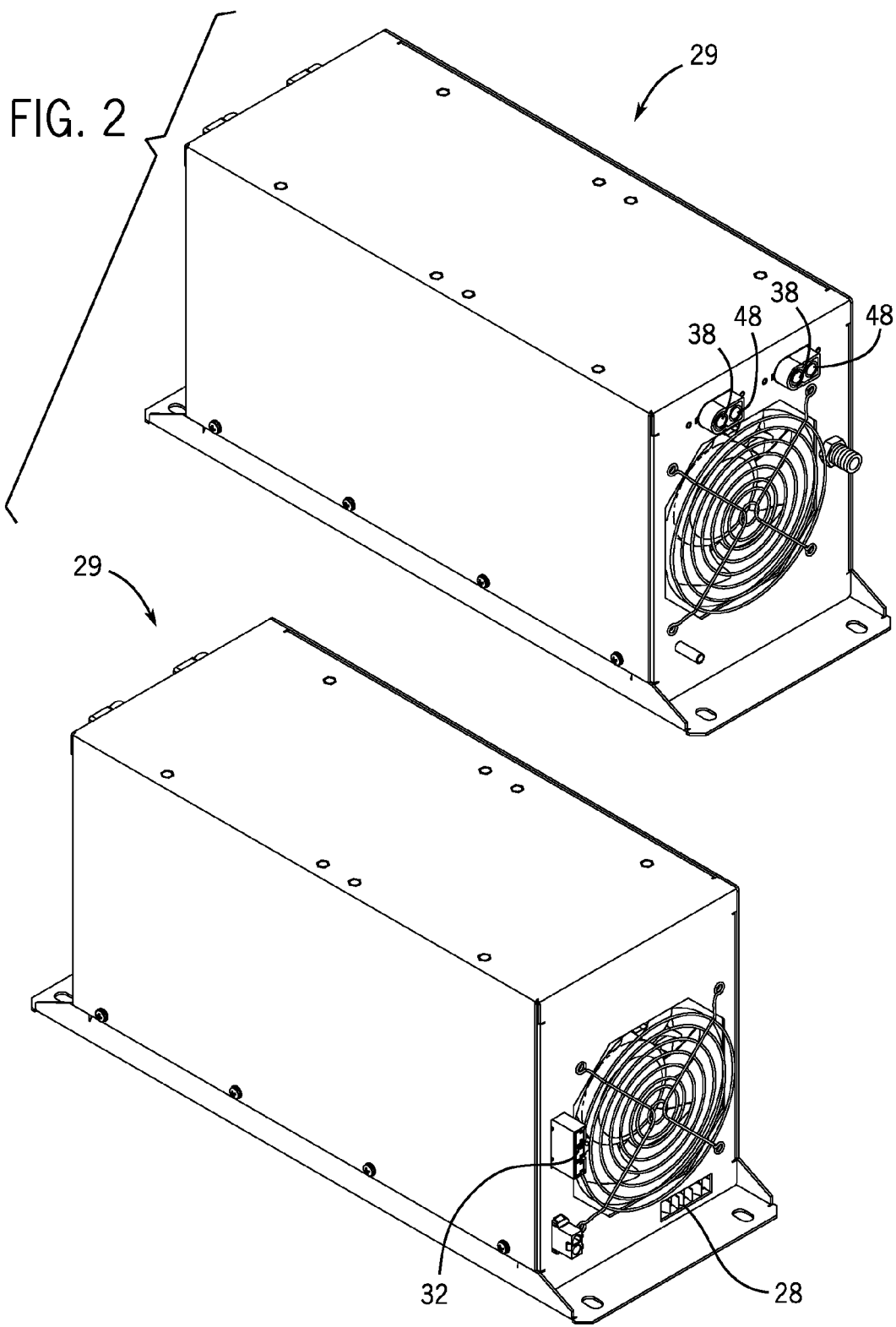
FIG. 2 illustrates perspective views of a power supply and circuitry system of the system of FIG. 1 according to an embodiment of the invention.
Figure 3:
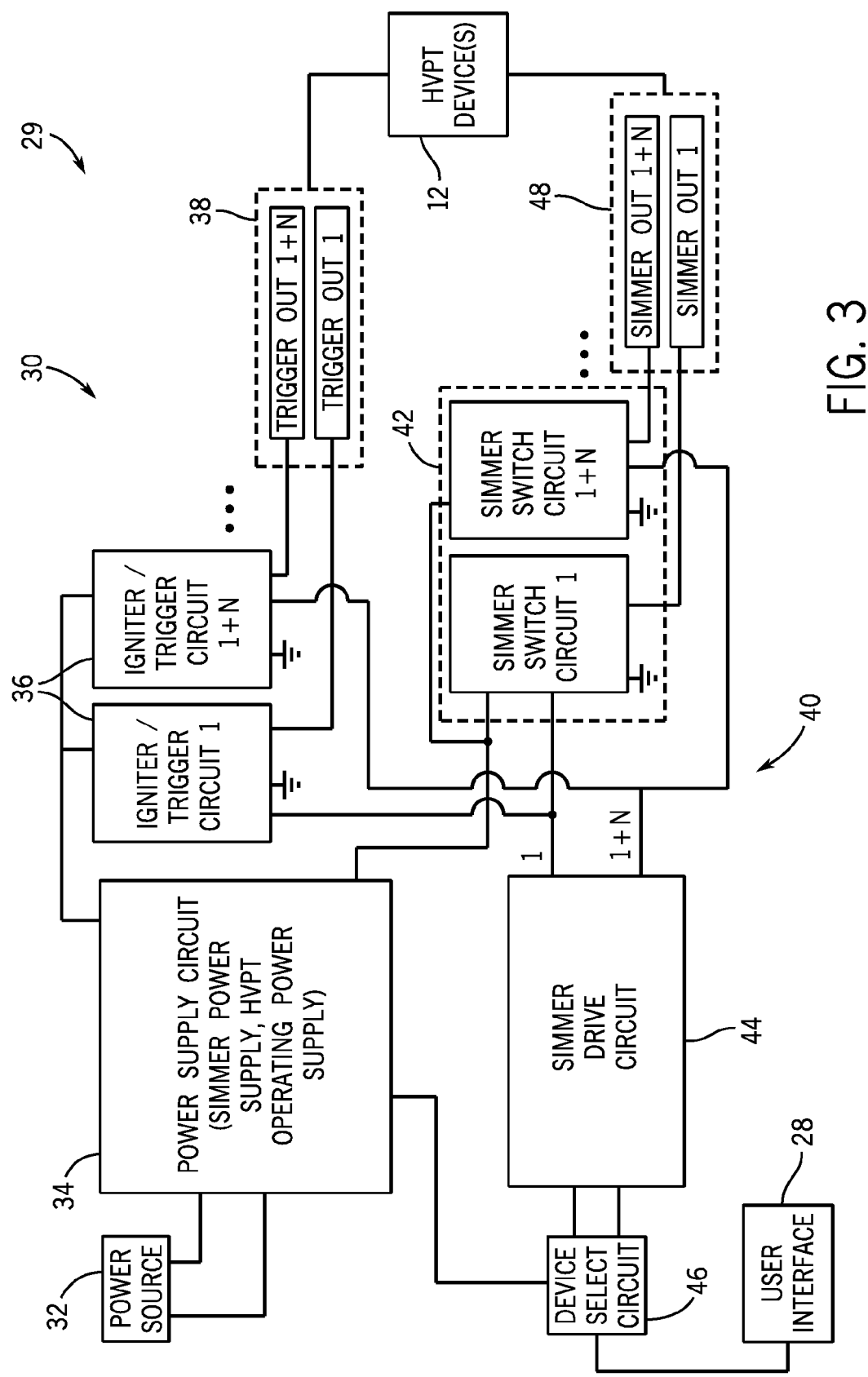
FIG. 3 is a block diagram of a power supply and circuitry system of the system of FIG. 1 according to an embodiment of the invention.

Referring now to FIGS. 2 and 3, perspective views and a block diagram of the power supply and circuitry system 29 enclosed in cabinet 14 of system 10 of FIG. 1 is shown according to an embodiment of the invention. The power supply and circuitry system 29 may be generally characterized as including circuitry 30 for controlling functioning of the system 29 and a power source 32. According to embodiments of the invention, power source 32 may be in the form of a high-voltage-capacitor-charging power supply for an arc-lamp-pumped laser system with multiple laser heads, with the power source 32 providing DC power from a suitable energy storage device or providing AC power from an AC mains (i.e., AC power from the electrical grid). Power source 32 is coupled to a power and control circuit 34 of circuitry 30 that receives power from the power source 32, conditions the received power, and provides a controlled output power therefrom to other components in the circuitry 30. More specifically, according to embodiments of the invention, power and control circuit 34 functions to output each of an HVPT operating power (to enable a main discharge of the HVPT device) to a selected HVPT device 12 as well as a simmer power to a selected HVPT device 12. While not shown, it is to be understood that power and control circuit 34 may include any or all of an energy storage device (for providing simmer power), a boost converter (for providing HVPT operating power), a controller, feedback circuitry, and any other appropriate circuit components and switches necessary for performing power conversion functions (e.g., power rectification, inversion and/or DC-DC conversion) and providing controlled output power. For purposes of simplicity, the power and control circuit 34 is referred to hereafter simply as a "power supply circuit,"—with it being understood that the power supply circuit functions as both a simmer power supply and as an HVPT main discharge power supply.

When system 10 is operating, power supply circuit 34 boosts the voltage from power source 32 to provide an appropriate operating power and routes the operating power from power source 32 to igniter or trigger circuits 36. Trigger circuits 36 selectively transfer the operating power from power supply circuit 34 to HVPT devices 12 when a user has selected an HVPT device of the HVPT devices 12 for use. Trigger circuits 36 are coupled to HVPT devices 12 by way of trigger circuit outputs 38. One trigger circuit of trigger circuits 36 is coupled to one HVPT device of HVPT devices 12. For example, Igniter/Trigger Circuit 1 is coupled to one HVPT device of HVPT devices 12, and Igniter/Trigger Circuit N+1 is coupled to a different HVPT device of HVPT devices 12.

While only two trigger circuits 36 (Igniter/Trigger Circuit 1 and Igniter/Trigger Circuit 1+N) are shown, circuitry 30 may include as many trigger circuits as required for the number of HVPT devices 12 in system 10. In some embodiments, circuitry 30 includes one trigger circuit for each HVPT device of HVPT devices 12 in system 10. In some embodiments, circuitry 30 includes a number of trigger circuits 36 greater than the number of HVPT devices 12 so that more HVPT devices may be added to system 10 at any time without needing to replace circuitry 30 with circuitry including more trigger circuits.

As indicated above power supply circuit 34 also outputs a simmer power therefrom—with the simmer power being provided either from a separate simmer power supply (not shown) in power supply circuit 34 or via appropriate conditioning/conversion of power received from power source 32. The simmer power output from power supply circuit 34 is provided to a simmer control circuit 40 that includes simmer switch circuits 42, a simmer drive circuit 44, and a device select circuit 46. In some embodiments, simmer drive circuit 44 and device select circuit 46 are combined in a microcontroller. Simmer switch circuits 42 selectively transfer the simmer power from power supply circuit 34 to HVPT devices 12 when a user has selected an HVPT device of the HVPT devices 12 for use. Simmer switch circuits 42 are coupled to the HVPT devices 12 by way of simmer switch circuit outputs 48. One simmer switch circuit of simmer switch circuits 42 is coupled to one HVPT device of HVPT devices 12. For example, Simmer Switch Circuit 1 is coupled to one HVPT device of HVPT devices 12, and Simmer Switch Circuit N+1 is coupled to a different HVPT device of HVPT devices 12.

While only two simmer switch circuits 42 are shown (Simmer Switch Circuit 1 and Simmer Switch Circuit 1+N), simmer control circuit 40 may include as many simmer switch circuits as required for the number of HVPT devices 12 in system 10. In some embodiments, simmer control circuit 40 includes a simmer switch circuit for each HVPT device of HVPT devices 12 in system 10. In some embodiments, simmer control circuit 40 includes a number of simmer switch circuits 42 greater than the number of HVPT devices 12 so that more HVPT devices may be added to system 10 at any time without needing to replace circuitry 30 with circuitry including a simmer control circuit including more simmer switch circuits or to replace simmer control circuit 40 in circuitry 30 with a simmer control circuit including more simmer switch circuits.

Simmer switch circuits 42 selectively couple the simmer power from power supply circuit 34 to HVPT devices 12 according to switch drive signals from simmer drive circuit 44. The switch drive signals from simmer drive circuit 44 may enable one simmer switch circuit of simmer switch circuits 42 to couple the simmer power from power supply circuit 34 to one HVPT device of the HVPT devices 12 at a time. For example, if the switch drive signals from simmer drive circuit 44 enable Simmer Switch Circuit 1 to couple the simmer power to one HVPT device of the HVPT devices 12, then the switch drive signals will disable Simmer Switch Circuit N+1 from coupling the simmer power to another HVPT device of the HVPT devices 12.

Simmer drive circuit 44 also outputs trigger signals to trigger circuits 36. The trigger signals from simmer drive circuit 44 may enable one trigger circuit of trigger circuits 36 to couple/transfer an HVPT operating voltage from power supply circuit 34 to one HVPT device of the high-voltage pulse-triggered devices 12 at a time. For example, if the trigger signals from simmer drive circuit 44 enable Igniter/Trigger Circuit 1 to couple the HVPT operating voltage to one HVPT device of the HVPT devices 12, then the trigger signals will disable Igniter/Trigger Circuit N+1 from coupling the HVPT operating voltage to another HVPT device of the HVPT devices 12.

Simmer drive circuit 44 outputs the switch drive signals to simmer switch circuits 42 and the trigger signals to trigger circuits 36 according to device selection signals received from device select circuit 46. Simmer drive circuit 44 is configured so that, when simmer drive circuit 44 receives the device selection signals from device select circuit 46, simmer drive circuit 44 only enables the simmer switch circuit of simmer switch circuits 42 and the trigger circuit of trigger circuits 36 coupled to the selected HVPT device of the HVPT devices 12 to couple the selected HVPT device to power supply circuit 34 to receive both a simmer power and HVPT operating power therefrom. In other words, when a user selects an HVPT device of HVPT devices 12 on user interface 28, simmer control circuit 40 only couples the selected HVPT device to the power supply circuit 34 to allow for transfer of a simmer power and operating power thereto. For example, if Simmer Switch Circuit 1 and Igniter/Trigger Circuit 1 are both coupled to the same HVPT device of the HVPT devices 12 and a user selects that HVPT device for use on user interface 28, then simmer drive circuit 44 enables only Simmer Switch Circuit 1 and Igniter/Trigger Circuit 1 to couple the power supply circuit 34 to the selected HVPT device to provide for transfer of a simmer power and operating power thereto.

The device select circuit 46 outputs the device selection signals to simmer drive circuit 44 after device select circuit 46 receives the device selection signals from user interface 28. User interface 28 outputs the device selection signals after a user selects one HVPT device of the HVPT devices 12 in system 10 for use. The device select circuit 46 also converts the device selection signals into a simmer power enable signal and outputs the simmer power enable signal to the power supply circuit 34. The simmer power enable signal enables the power supply circuit 34 to generate a simmer power (e.g., allows a simmer power supply in the power supply circuit 34 to power on) when a user has selected an HVPT device of the HVPT devices 12 for use. Otherwise, the simmer power from power supply circuit 34 is powered off.

Figure 4:
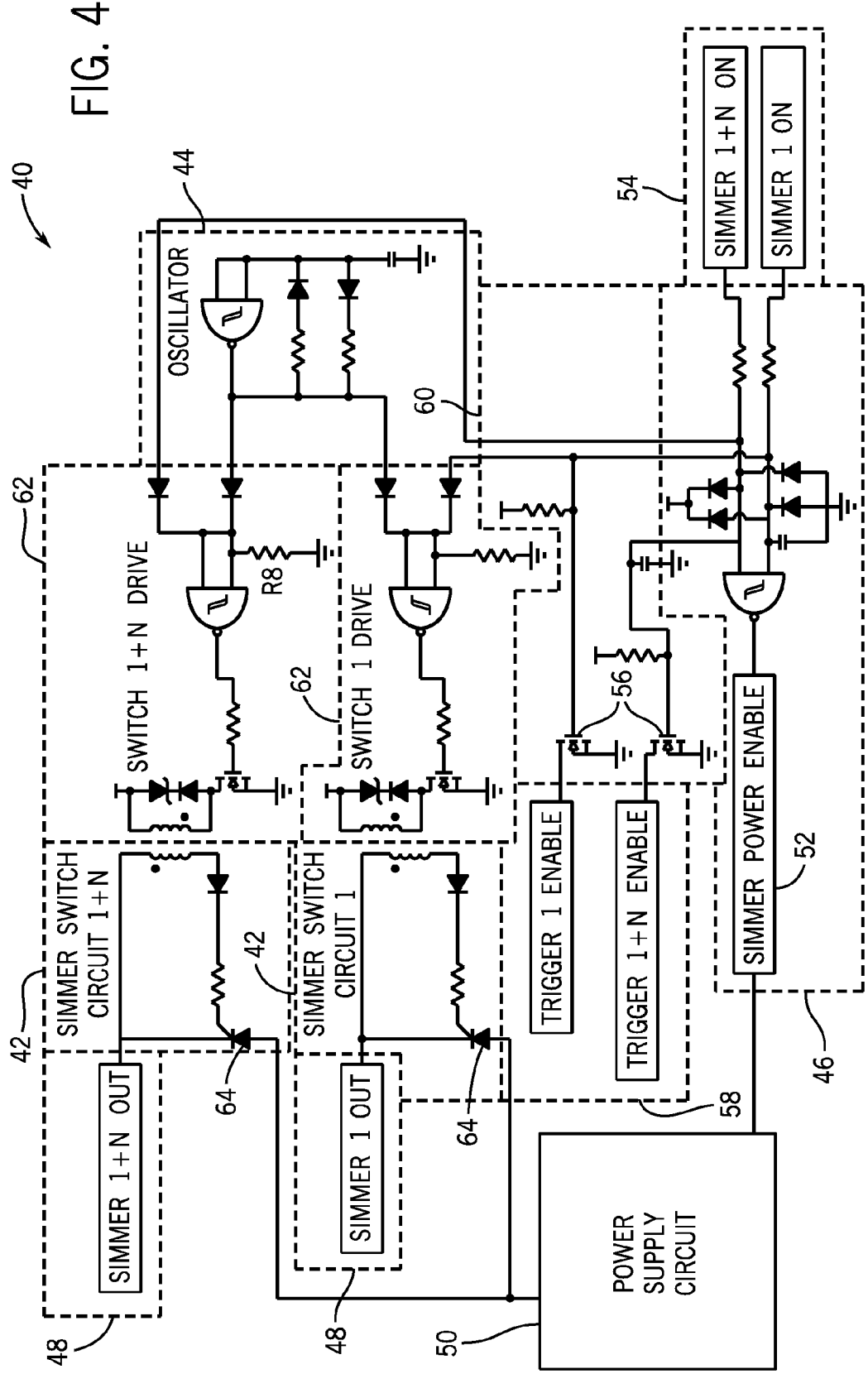
FIG. 4 is a schematic of the simmer control circuit of FIG. 3 according to an embodiment of the invention.

Referring now to FIG. 4, and with continued reference to FIGS. 2 and 3, a schematic of simmer control circuit 40 of FIG. 2 is shown according to an embodiment of the invention. In FIG. 4, simmer control circuit 40 is coupled to a power supply circuit 50, such as power supply circuit 34, by way of simmer switch circuits 42 and device select circuit 46. A simmer power supplied by power supply circuit 50 is selectively enabled by SIMMER POWER ENABLE output 52, which receives the simmer power enable signal from device select circuit 46. Device select circuit 46 receives the device selection signals from user interface 28 and converts the device selection signals into the simmer power enable signal. The simmer power enable signal is a SIMMER POWER ON signal if an HVPT device of HVPT devices 12 has been selected, and SIMMER POWER ENABLE signal 52 is a SIMMER POWER OFF signal if no HVPT device of HVPT devices 12 has been selected.

Device select circuit 46 receives the device selection signals from user interface 28 by way of device select circuit inputs 54. Only one device select circuit input of device select circuit inputs 54 receives the device selection signals from user interface 28 as a DEVICE ON signal. All other device select circuit inputs of device select circuit inputs 54 receive a DEVICE OFF signal from user interface 28. For example, if user interface 28 outputs a DEVICE ON signal to SIMMER 1 ON, user interface 28 outputs a DEVICE OFF signal to SIMMER 1+N ON.

While only two device select circuit inputs 54 are shown (SIMMER 1 ON and SIMMER 1+N ON), device select circuit 46 may include as many device select circuit inputs as required for the number of HVPT devices 12 in system 10. In some embodiments, device select circuit 46 includes a device select circuit input for each HVPT device of HVPT devices 12 in system 10. In some embodiments, device select circuit 46 includes a number of device select circuit inputs 54 greater than the number of HVPT devices 12 so that more HVPT devices may be added to system 10 at any time without needing to replace simmer control circuit 40 with a simmer control circuit including a device select circuit including more device select circuit inputs.

Device select circuit 46 also outputs the device selection signals to simmer drive circuit 44. Simmer drive circuit 44 converts the device selection signals into switch drive signals for simmer switch circuits 42 and trigger signals for trigger circuits 36. Simmer drive circuit 44 converts the device selection signals into the trigger signals via switches 56. Simmer drive circuit 44 then outputs the triggers signals by way of trigger drive outputs 58.

Only one trigger drive output of trigger drive outputs 58 receives a TRIGGER ON signal corresponding to the DEVICE ON signal from user interface 28 to enable the trigger circuit of trigger circuits 36 coupled to the trigger output to transfer an HVPT operating power from power supply circuit 50 to the HVPT device of HVPT devices 12 selected by a user. All the other trigger drive outputs of trigger drive outputs 58 receive TRIGGER OFF signals corresponding to the DEVICE OFF signals from user interface 28 to disable all the trigger circuits of trigger circuits 36 coupled to all the other trigger drive outputs from transferring an HVPT operating power from power supply circuit 50 to HVPT devices of HVPT devices 12 not selected by a user. For example, if device selection circuit 46 outputs to simmer drive circuit 44 a DEVICE ON signal received at SIMMER 1 ON and a DEVICE OFF signal received at SIMMER 1+N ON, then simmer drive circuit 44 converts the DEVICE ON signal to a TRIGGER ON signal and the DEVICE OFF signal to a TRIGGER OFF signal and outputs the TRIGGER ON signal to TRIGGER 1 ENABLE to enable Igniter/Trigger Circuit 1 to provide an HVPT operating power from power supply circuit 50 to an HVPT device of HVPT devices 12 selected by a user and the TRIGGER OFF signal to TRIGGER 1+N ENABLE to disable Igniter/Trigger Circuit 1+N from providing an HVPT operating power from power supply circuit to an HVPT device of HVPT devices 12 not selected by the user.

While only two trigger drive outputs 58 are shown (TRIGGER 1 ENABLE and TRIGGER 1+N ENABLE), simmer drive circuit 44 may include as many trigger drive outputs as required for the number of HVPT devices 12 in system 10. In some embodiments, simmer drive circuit 44 includes a trigger drive output for each trigger circuit of trigger circuits 36 in circuitry 30. In some embodiments, simmer drive circuit 44 includes a number of trigger drive outputs 58 greater than the number of trigger circuits 36 so that more trigger circuits may be added to circuitry 30 at any time without needing to replace simmer control circuit 40 with a simmer control circuit including a simmer drive circuit including more trigger drive outputs.

Simmer drive circuit 44 converts the device selection signals received thereby into the switch drive signals by way of oscillator circuit 60 and switch drive circuits 62. Oscillator circuit 60 outputs an oscillator signal to switch drive circuits 62 continuously while simmer control circuit 40 has power. Switch drive circuits 62 receive the device selection signals and the oscillator signal and convert the device selection signals and the oscillator signal into the switch drive signals. Switch drive circuits 62 then output the switch drive signals to simmer switch circuits 42.

Only one simmer switch circuit of simmer switch circuits 42 receives a DRIVE ON signal corresponding to the DEVICE ON signal from user interface 28 to enable the simmer switch circuit of simmer switch circuits 42 coupled to the HVPT device of the HVPT devices 12 selected by a user to couple power supply circuit 50 to the selected HVPT device, so as to provide simmer power thereto. All the other simmer switch circuits of simmer switch circuits 42 receive DRIVE OFF signals corresponding to the DEVICE OFF signals from user interface 28 to disable all the other the simmer switch circuits from coupling power supply circuit 50 to HVPT devices of HVPT devices 12 not selected by a user.

For example, if device selection circuit 46 outputs to simmer drive circuit 44 a DEVICE ON signal received at SIMMER 1 ON and a DEVICE OFF signal received at SIMMER 1+N ON, then simmer drive circuit 44 converts the DEVICE ON signal to a DRIVE ON signal in SWITCH 1 DRIVE and the DEVICE OFF signal to a DRIVE OFF signal in SWITCH 1+N DRIVE and outputs the DRIVE ON signal to SIMMER SWITCH CIRCUIT 1 to enable SIMMER SWITCH CIRCUIT 1 to couple power supply circuit 50 to an HVPT device of HVPT devices 12 selected by a user and provide simmer power thereto and the DRIVE OFF signal to SIMMER SWITCH CIRCUIT 1+N to disable SIMMER SWITCH CIRCUIT 1+N from coupling power supply circuit 50 to an HVPT device of HVPT devices 12 not selected by the user.

While only two switch drive circuits 62 are shown (SWITCH 1 DRIVE and SWITCH 1+N DRIVE), simmer drive circuit 44 may include as many drive circuits as required for the number of simmer switch circuits 42 in simmer control circuit 40. In some embodiments, simmer drive circuit 44 includes a drive circuit for each simmer switch circuit of simmer switch circuits 42 in simmer control circuit 40. In some embodiments, simmer drive circuit 44 includes a number of switch drive circuits 62 greater than the number of simmer switch circuits 42 so that more simmer switch circuits may be added to simmer control circuit 40 at any time without needing to replace simmer control circuit 40 with a simmer control circuit including a simmer drive circuit including more drive circuits.

Simmer drive circuits 42 receive the switch drive signals and direct the switch drive signals to switches 64 in simmer switch circuits 42. In an exemplary embodiment, switches 64 are silicon controlled rectifiers (SCRs). When switches 64 of simmer switch circuits 42 are driven on by the switch drive signals, power supply circuit 50 is coupled to HVPT devices 12 in system 10 by way of simmer switch circuit outputs 48 (SIMMER 1 OUT and SIMMER 1+N OUT), so as to enable the providing of simmer power thereto.

Only one switch of switches 64 of simmer switch circuits 42 may receive a DRIVE ON signal from switch drive circuits 62 at a time. All the other switches of switches 64 receive DRIVE OFF signals from drive circuits 62. Therefore, only one simmer switch circuit output of simmer switch circuit outputs 48 is coupled to power supply circuit 50. All the other simmer switch circuit outputs of simmer switch circuit outputs 48 are not coupled to power supply circuit 50.

For example, if device selection circuit 46 outputs to simmer drive circuit 44 a DEVICE ON signal received at SIMMER 1 ON and a DEVICE OFF signal received at SIMMER 1+N ON, then simmer drive circuit 44 converts the DEVICE ON signal to a DRIVE ON signal in SWITCH 1 DRIVE and the DEVICE OFF signal to a DRIVE OFF signal in SWITCH 1+N DRIVE and outputs the DRIVE ON signal to drive switch 64 in SIMMER SWITCH CIRCUIT 1 to couple a simmer power from power supply circuit 50 to SIMMER 1 OUT and the DRIVE OFF signal to disable switch 64 in SIMMER SWITCH CIRCUIT 1+N from coupling a simmer power from power supply circuit 50 to SIMMER 1+N OUT.

For purposes of better illustrating the functioning of simmer control circuit 40 during operation of system 10, an example operation of simmer control circuit 40 for coupling an HVPT device of HVPT devices 12 in system 10 is set forth here below. First, a user selects an HVPT device of HVPT devices 12 coupled to SIMMER 1 OUT of simmer switch circuit outputs 48 on user interface 28. User interface 28 outputs device selection signals including a DEVICE ON signal to SIMMER 1 ON of the device select circuit inputs 54 and a DEVICE OFF signal to SIMMER 1+N ON of the device select circuit inputs 54. Device select circuit 46 converts the device selection signals to a SIMMER POWER ON signal and outputs the SIMMER POWER ON signal to SIMMER POWER ENABLE output 52, which outputs the SIMMER POWER ON signal to power supply circuit 50 to enable power supply circuit 50 to power on so as to generate a simmer power. Device select circuit 46 also outputs the DEVICE ON signal and the DEVICE OFF signal to simmer drive circuit 44. Simmer drive circuit 44 converts the DEVICE ON signal into a TRIGGER ON signal and the DEVICE OFF signal into a TRIGGER OFF signal and outputs the TRIGGER ON signal to TRIGGER 1 ENABLE of trigger drive outputs 58 to enable Igniter/Trigger Circuit 1 and the TRIGGER OFF signal to TRIGGER 1+N ENABLE of trigger drive outputs 58 to disable Igniter/Trigger Circuit 1+N.

Simmer drive circuit 44 also converts the DEVICE ON signal and an oscillation signal from oscillator 60 to a DRIVE ON signal in SWITCH 1 DRIVE of switch drive circuits 62 and the DEVICE OFF signal and the oscillation signal from oscillator 60 to a DRIVE OFF signal in SWITCH 1+N DRIVE of switch drive circuits 62. SWITCH 1 DRIVE of switch drive circuits 62 outputs the DRIVE ON signal to switch 64 of SIMMER SWITCH CIRCUIT 1 of simmer switch circuits 42, and SWITCH 1+N DRIVE of switch drive circuits 62 outputs the DRIVE OFF signal to switch 64 of SIMMER SWITCH CIRCUIT 1+N of simmer switch circuits 42. The DRIVE ON signal drives switch 64 of SIMMER SWITCH CIRCUIT 1 of simmer switch circuits 42 to couple simmer power supply circuit 50 to SIMMER 1 OUT of simmer switch circuit outputs 48, and the DRIVE OFF signal disables switch 64 of SIMMER SWITCH CIRCUIT 1+N of switch circuit outputs 48 from coupling power supply circuit 50 to SIMMER 1+N OUT. Because power supply circuit 50 is coupled to SIMMER 1 OUT of simmer switch circuit outputs 48, power supply circuit 50 is coupled to the selected HVPT device coupled to SIMMER 1 OUT of simmer switch circuit outputs 48 to provide a simmer power thereto.

While the example operation of simmer control circuit 40 was described with an HVPT device of HVPT devices 12 in system 10 coupled to SIMMER 1 OUT of simmer switch circuits outputs 48, the operation of simmer control circuit 40 can be extrapolated to any of the other HVPT devices of HVPT devices 12, such as an HVPT device of HVPT devices 12 coupled to SIMMER 1+N OUT of simmer switch circuits outputs 48. The operation of simmer control circuit 40 would be the same as in the example, except the DEVICE ON signal from user interface 28 would be outputted to SIMMER 1+N ON of device select circuit inputs 54, and the DEVICE OFF signal from user interface 28 would be outputted to SIMMER 1 ON of device selection circuit inputs 54.

Figure 5:
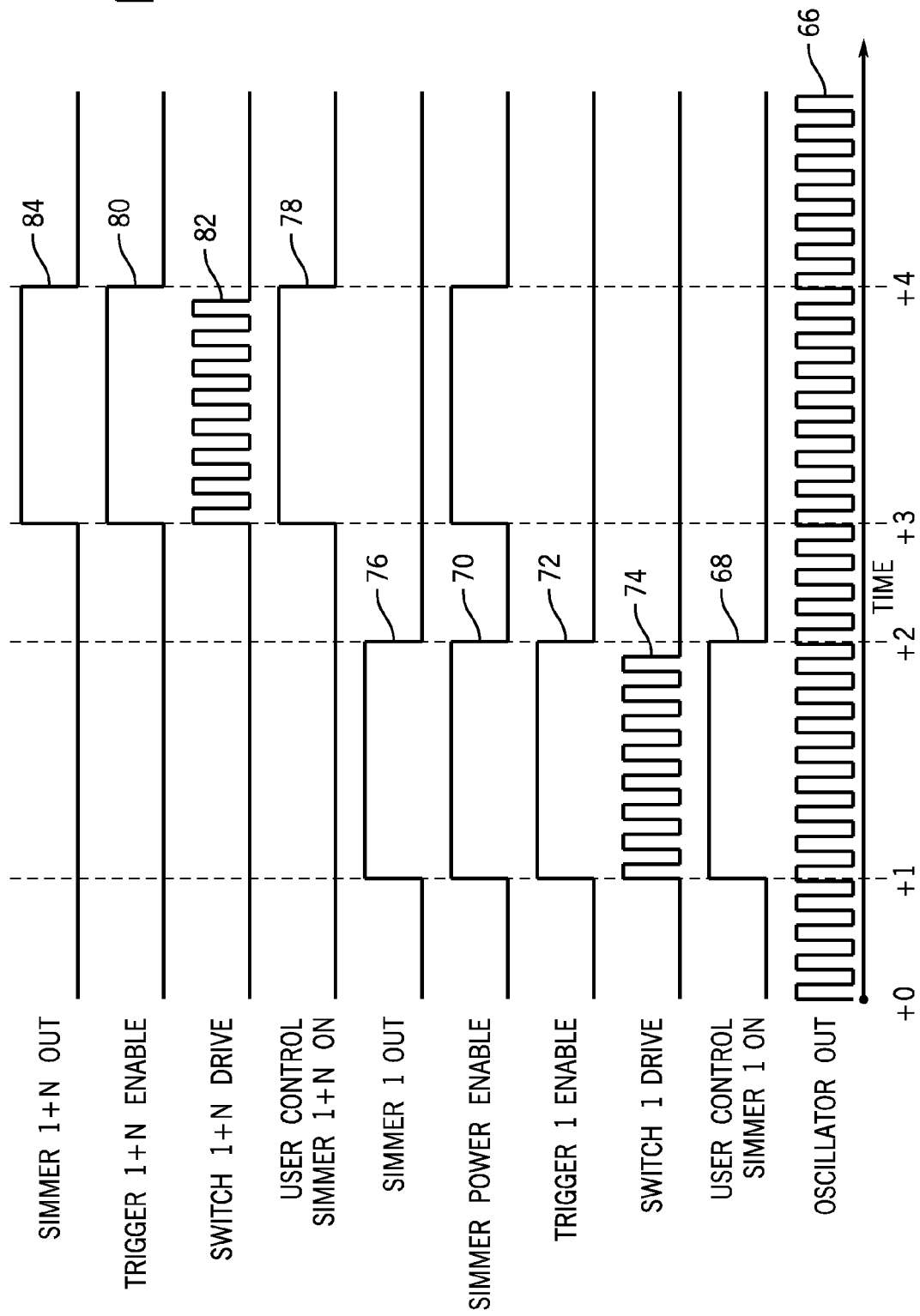
FIG. 5 is a diagram of an example of the operation of the simmer control circuit of FIG. 4 according to an embodiment of the invention.

Referring now to FIG. 5, and with continued reference to FIGS. 3 and 4, a diagram of an example of the operation of simmer control circuit 40 of FIG. 4 is shown according to an embodiment of the invention. Beginning at time t0, all waveforms in FIG. 4 are in an OFF state with the exception of OSCILLATOR OUT waveform 66 corresponding to the oscillator signal from oscillator circuit 60. At time t1, a user selects an HVPT device of HVPT devices 12 on user interface 28, and user interface 28 outputs a DEVICE ON signal to SIMMER 1 ON of device select circuit inputs 54. As shown by SIMMER 1 ON waveform 68, the selected HVPT device is in use until time t2, when user interface 28 sends a DEVICE OFF signal to SIMMER 1 ON of device select circuit inputs 54. When the selected HVPT device is on from time t1 to time t2, simmer control circuit 40 outputs a SIMMER POWER ON signal to SIMMER POWER ENABLE output 52, as shown by SIMMER POWER ENABLE waveform 70, and a TRIGGER ON signal to TRIGGER 1 ENABLE of trigger drive outputs 58, as shown by TRIGGER 1 ENABLE waveform 72.

Also when the selected HVPT device is on from time t1 to time t2, device select circuit 46 outputs the DEVICE ON signal to SWITCH 1 DRIVE of switch drive circuits 62, and SWITCH 1 DRIVE of switch drive circuits 62 outputs a switch drive signal to switch 64 of SIMMER SWITCH CIRCUIT 1 of simmer switch circuits 42 that alternates between a DRIVE ON signal and a DRIVE OFF signal according to OSCILLATOR OUT waveform 66 as shown by SWITCH 1 DRIVE waveform 74. In addition, as shown by SIMMER 1 OUT waveform 76, when SIMMER 1 ON of device select circuit inputs 54 receives a DEVICE ON signal from user interface 28, SIMMER 1 OUT of simmer switch circuit outputs 48 is enabled.

From time t2 to time t3, a user has not selected an HVPT device of HVPT devices 12 for use, so all waveforms in FIG. 4 are in an OFF state with the exception of OSCILLATOR OUT waveform 66. At time t3, a user selects an HVPT device of HVPT devices 12 (different from the HVPT device selected at time t1) on user interface 28, and user interface 28 outputs a DEVICE ON signal to SIMMER 1+N ON of device select circuit inputs 54. As shown by SIMMER 1+N ON waveform 78, the selected HVPT device is in use until time t4, when user interface 28 sends a DEVICE OFF signal to SIMMER 1+N ON of device select circuit inputs 54. When the selected HVPT device is on from time t3 to time t4, simmer control circuit 40 outputs a SIMMER POWER ON signal to SIMMER POWER ENABLE output 52 as shown by SIMMER POWER ENABLE waveform 70 and a TRIGGER ON signal to TRIGGER 1+N ENABLE of trigger drive outputs 58 as shown by TRIGGER 1 ENABLE waveform 80.

Also when the selected HVPT device is on from time t3 to time t4, device select circuit 46 outputs the DEVICE ON signal to SWITCH 1+N DRIVE of switch drive circuits 62, and SWITCH 1+N DRIVE of switch drive circuits 62 outputs a switch drive signal to switch 64 of SIMMER SWITCH CIRCUIT 1+N of simmer switch circuits 42 that alternates between a DRIVE ON signal and a DRIVE OFF signal according to OSCILLATOR OUT waveform 66 as shown by SWITCH 1+N DRIVE waveform 82. In addition, as shown by SIMMER 1+N OUT waveform 84, when SIMMER 1+N ON of device select circuit inputs 54 receives a DEVICE ON signal from user interface 28, SIMMER 1+N OUT of simmer switch circuit outputs 48 is enabled.

Figure 6:
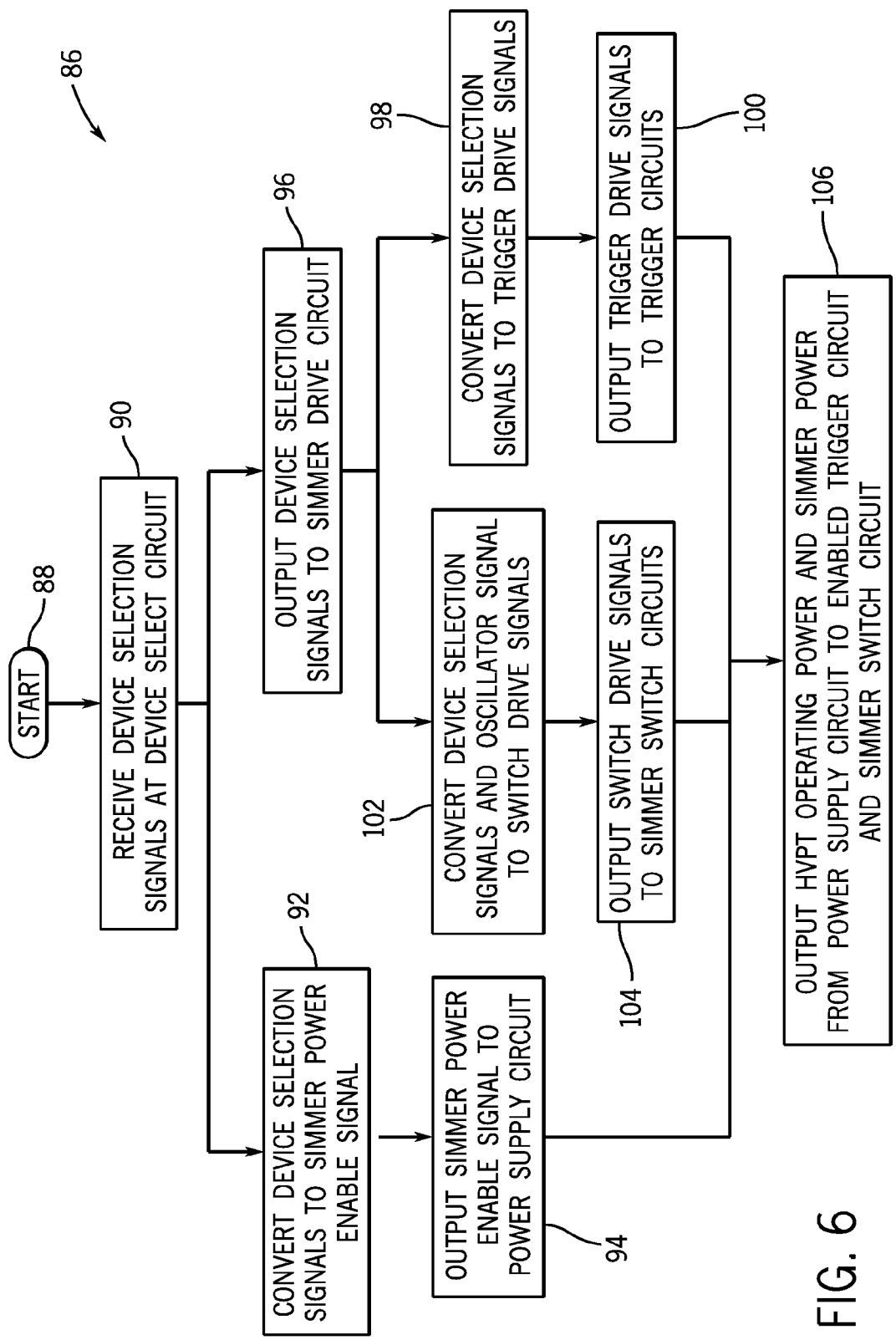
FIG. 6 is a flowchart illustrating a technique for controlling the simmer control circuit of FIG. 4 according to an embodiment of the invention.

Referring now to FIG. 6, a flowchart illustrating a technique 86 for controlling simmer control circuit 40 of FIG. 4 is shown according to an embodiment of the invention. Process 86 begins at STEP 88 when a user selects an HVPT device of HVPT devices 12 on user interface 28 and user interface 28 outputs device selection signals to device selection circuit 46. At STEP 90, device selection circuit 46 receives the device selection signals from user interface 28, with the technique then continuing at STEP 92 where device selection circuit 46 converts the device selection signals to a simmer power enable signal to selectively enable providing of a simmer power from power supply circuit 50. At STEP 94, device select circuit 46 outputs the simmer power enable signal to power supply circuit 50 by way of SIMMER POWER ENABLE output 52.

At STEP 96, which occurs simultaneously with STEP 92, device select circuit 46 outputs the device selection signals to simmer drive circuit 44. At STEP 98, simmer drive circuit 44 converts the device selection signals to trigger signals to selectively enable trigger circuits 36 by way of switches 56. At STEP 100, simmer drive circuit 44 outputs the trigger signals to trigger circuits 36 by way of trigger drive outputs 58. At STEP 102, which occurs simultaneously with STEP 98, simmer drive circuit 44 converts the device selection signals and an oscillator signal from oscillator circuit 60 to switch drive signals by way of switch drive circuits 62. At STEP 104, switch drive circuits 62 output the switch drive signals to switches 64 of simmer switch circuits 42 to selectively couple power supply circuit 50 to simmer switch circuit outputs 48 to provide a simmer power thereto. Finally, at STEP 106, an HVPT operating power and simmer power are output from power supply circuit 50 to the enabled trigger circuit 36 and simmer switch circuit 42, with the HVPT operating power and simmer power then being provided to a selected HVPT device 12 via the respective trigger circuit output 38 and simmer switch circuit output 48.

Beneficially, embodiments of the invention thus provide a simmer control circuit including a device select circuit including multiple inputs for a user interface, a simmer drive circuit, and simmer switch circuits with multiple outputs to multiple HVPT devices. The simmer control circuit may enable a system including multiple HVPT devices to operate with a single simmer power supply. The use of a single simmer power supply in a system including multiple HVPT devices may reduce the component count of the system, the manufacturing cost of the system, and the physical size of the system.

Therefore, according to one embodiment of the invention, a power supply and circuitry system for powering multiple HVPT devices includes a power supply circuit configured to selectively provide an operating power and a simmer power to at least two HVPT devices, and a trigger circuit for each HVPT device of the at least two HVPT devices that selectively couples the power supply circuit to one HVPT device of the at least two HVPT devices to provide the operating power thereto, wherein each trigger circuit is coupled to one HVPT device of the at least two HVPT devices. The power supply and circuitry system also includes a simmer control circuit for selectively coupling the power supply circuit to the at least two HVPT devices to provide the simmer power thereto, the simmer control circuit further including a simmer switch circuit for each HVPT device of the at least two HVPT devices, wherein each simmer switch circuit comprises an input coupled to the power supply circuit to receive the simmer power therefrom and an output coupled to one HVPT device of the at least two HVPT devices. The simmer control circuit also further includes a simmer drive circuit coupled to each simmer switch circuit for selectively enabling the simmer switch circuits.

According to another embodiment of the invention, a simmer control circuit for selectively coupling a simmer power supply to multiple HVPT devices includes at least two simmer switch circuits, wherein each simmer switch circuit comprises an input coupleable to a simmer power supply and an output coupleable to an HVPT device. The simmer control circuit also includes a simmer drive circuit coupled to each simmer switch circuit of the at least two simmer switch circuits for selectively enabling the at least two simmer switch circuits and a device select circuit coupled to the simmer drive circuit for selectively enabling the simmer drive circuit. The simmer drive circuit enables a simmer switch circuit of the at least two simmer switch circuits responsive to a selection of an HVPT device provided as an input to the device select circuit, so as cause the enabled simmer switch circuit to provide a simmer power from the simmer power supply to the selected HVPT device.

According to yet another embodiment of the invention, a method of providing simmer power to multiple HVPT devices includes providing a single simmer power supply and providing at least two simmer switch circuits, wherein each simmer switch circuit comprises an input coupleable to the single simmer power supply and an output coupleable to a respective HVPT device of the multiple HVPT devices. The method also includes coupling a simmer drive circuit to each simmer switch circuit of the at least two simmer switch circuits for selectively enabling the at least two simmer switch circuits, coupling a device select circuit to the simmer drive circuit for selectively enabling the simmer drive circuit, and providing an input to the device select circuit comprising selection of an HVPT device of the multiple HVPT devices for operation. The method further includes generating a device selection signal via the device select circuit responsive to the input and causing the simmer drive circuit to enable a simmer switch circuit of the at least two simmer switch circuits responsive to the device selection signal, with the enabled simmer switch circuit providing a simmer power from the single simmer power supply to the selected HVPT device.

The present invention has been described in terms of the preferred embodiment, and it is recognized that equivalents, alternatives, and modifications, aside from those expressly stated, are possible and within the scope of the appending claims.

What is claimed is:

1. A power supply and circuitry system for powering multiple high-voltage-pulse-triggered (HVPT) devices, the system comprising:
   a power supply circuit configured to selectively provide an operating power and a simmer power to at least two HVPT devices;
   a trigger circuit for each HVPT device of the at least two HVPT devices that selectively couples the power supply circuit to one HVPT device of the at least two HVPT devices to provide the operating power thereto, wherein each trigger circuit is coupled to one HVPT device of the at least two HVPT devices; and
   a simmer control circuit for selectively coupling the power supply circuit to the at least two HVPT devices to provide the simmer power thereto, the simmer control circuit comprising:
      a simmer switch circuit for each HVPT device of the at least two HVPT devices, wherein each simmer switch circuit comprises an input coupled to the power supply circuit to receive the simmer power therefrom and an output coupled to one HVPT device of the at least two HVPT devices; and
      a simmer drive circuit coupled to each simmer switch circuit for selectively enabling the simmer switch circuits.

2. The system of claim 1 wherein the simmer control circuit further comprises a device select circuit coupled to the simmer drive circuit; and
   wherein the system further comprises a user interface coupled to the device select circuit and configured to enable a user selection of one HVPT device of the at least two HVPT devices for use.

3. The system of claim 2 wherein, responsive to a user selection of one HVPT device of the at least two HVPT devices for use on the user interface, the user interface sends a signal to the simmer control circuit that enables the power supply circuit to generate the simmer power, enables the trigger circuit coupled to the selected HVPT device, and enables the simmer switch circuit coupled to the selected HVPT device.

4. The system of claim 1 wherein the simmer drive circuit comprises a switch drive circuit for each simmer switch circuit for selectively enabling one simmer switch circuit of the simmer switch circuits, wherein each switch drive circuit is coupled to one of the simmer switch circuits.

5. The system of claim 1 wherein the simmer drive circuit comprises an oscillator circuit.

6. The system of claim 1 wherein the simmer drive circuit is coupled to each trigger circuit for selectively enabling the trigger circuits.

7. The system of claim 1 wherein the power supply circuit functions as a single simmer power supply that selectively provides the simmer power to each of the at least two HVPT devices.

8. A simmer control circuit for selectively coupling a simmer power supply to multiple high-voltage-pulse-triggered (HVPT) devices, the simmer control circuit comprising:
   at least two simmer switch circuits, wherein each simmer switch circuit comprises an input coupleable to a simmer power supply and an output coupleable to an HVPT device;

a simmer drive circuit coupled to each simmer switch circuit of the at least two simmer switch circuits for selectively enabling the at least two simmer switch circuits; and a device select circuit coupled to the simmer drive circuit for selectively enabling the simmer drive circuit;

wherein the simmer drive circuit enables a simmer switch circuit of the at least two simmer switch circuits responsive to a selection of an HVPT device provided as an input to the device select circuit, so as cause the enabled simmer switch circuit to provide a simmer power from the simmer power supply to the selected HVPT device.

9. The simmer control circuit of claim 8 wherein the simmer drive circuit comprises a switch drive circuit for each simmer switch circuit of the at least two simmer switch circuits for selectively enabling one simmer switch circuit of the at least two simmer switch circuits, wherein each switch drive circuit is coupled to one of the simmer switch circuits of the at least two simmer switch circuits.

10. The simmer control circuit of claim 8 wherein the simmer drive circuit comprises an oscillator circuit.

11. The simmer control circuit of claim 8 wherein each of the at least two simmer switch circuits comprises a switch configured to be selectively enabled by the simmer drive circuit.

12. The simmer control circuit of claim 11 wherein each switch of the at least two simmer switch circuits comprises a silicon-controlled rectifier.

13. The simmer control circuit of claim 8 wherein the simmer drive circuit and the device select circuit are combined in a microcontroller.

14. The simmer control circuit of claim 8 wherein the simmer control circuit is configured for use in an arc-lamp-pumped laser system comprising at least two laser heads.

15. A method of providing simmer power to multiple high-voltage-pulse-triggered (HVPT) devices, the method comprising:

providing a single simmer power supply;

providing at least two simmer switch circuits, wherein each simmer switch circuit comprises an input coupleable to the single simmer power supply and an output coupleable to a respective HVPT device of the multiple HVPT devices;

coupling a simmer drive circuit to each simmer switch circuit of the at least two simmer switch circuits for selectively enabling the at least two simmer switch circuits;

coupling a device select circuit to the simmer drive circuit for selectively enabling the simmer drive circuit;

providing an input to the device select circuit comprising selection of an HVPT device of the multiple HVPT devices for operation;

generating a device selection signal via the device select circuit responsive to the input; and causing the simmer drive circuit to enable a simmer switch circuit of the at least two simmer switch circuits responsive to the device selection signal, with the enabled simmer switch circuit providing a simmer power from the single simmer power supply to the selected HVPT device.

16. The method of claim 15 wherein the simmer drive circuit comprises a switch drive circuit for each simmer switch circuit of the at least two simmer switch circuits for selectively enabling one simmer switch circuit of the simmer switch circuits; and wherein coupling the simmer drive circuit to each simmer switch circuit of the at least two simmer switch circuits comprises coupling each switch drive circuit to one of the simmer switch circuits of the at least two simmer switch circuits.

17. The method of claim 16 wherein each of the at least two simmer switch circuits comprises a switch configured to be selectively enabled by the simmer drive circuit; and wherein coupling the simmer drive circuit to each simmer switch circuit of the at least two simmer switch circuits comprises coupling each switch of the at least two simmer switch circuits to one switch drive circuit of the simmer drive circuit.

18. The method of claim 17 wherein the simmer drive circuit comprises an oscillator circuit; and wherein the method further comprises converting the device selection signals received by the simmer drive circuit into switch drive signals by way of the oscillator circuit and the switch drive circuits.

19. The method of claim 18 wherein each switch of the at least two simmer switch circuits comprises a silicon-controlled rectifier; and wherein the method further comprises controlling switching of the silicon-controlled rectifiers of the simmer switch circuits via the switch drive signals.

20. The method of claim 15 wherein coupling the device select circuit to the simmer drive circuit comprises combining the device select circuit and the simmer drive circuit in a microcontroller.

* * * * *